Sept. 16, 1952 P. D. BECKER 2,610,355
FRICTION HINGE
Filed Feb. 25, 1948

INVENTOR.
PHILIP D. BECKER
BY Philip E. Parker
ATTORNEY.

Patented Sept. 16, 1952

2,610,355

UNITED STATES PATENT OFFICE 2,610,355

FRICTION HINGE

Philip D. Becker, Hingham, Mass., assignor to United-Carr Fastener Corporation, Cambridge, Mass., a corporation of Massachusetts Application February 25, 1948, Serial No. 10,630

1 Claim. (Cl. 16—142)

The present invention relates to pivotal mountings, particularly those adaptable for use in pivotally connecting an eye shield and the like to a support such as a cap vizor, and aims generally to improve existing mountings of that type.

A primary object of the invention is the provision of an improved and simplified pivotal mounting particularly adaptable for connecting an eye shield or the like to a support, such as a cap vizor, which mounting will be economical to manufacture and efficient in use.

Other aims and objects of the invention will be apparent to persons skilled in the art to which the invention relates, from a consideration of the accompanying drawings and annexed specification illustrating and describing a preferred embodiment of the invention.

In the drawings—

Figure 1:
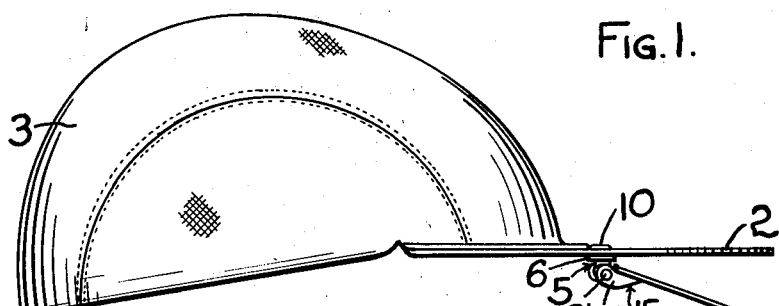
Fig. 1 is a side elevation illustrating one application of the pivotal mounting of the present invention, namely to pivotally connect an eye shield to a cap vizor.
Figure 2:
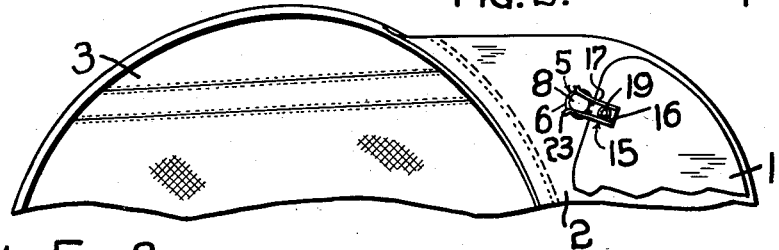
Fig. 2 is a fragmentary bottom plan view of the installation shown in Fig. 1.

Referring to the drawings, the pivotal mounting of the invention advantageously may be employed for pivotally mounting an eye shield 1 of suitable sheet material, to a support such as the vizor 2 of a cap 3 though it will be understood that the invention is not restricted to such use.

The pivotal mounting of the present invention comprises a post adapted to be securely attached to a support, for example the cap vizor 2 of the illustrated embodiment, and a fastener member secured to the part to be supported, for example the eye shield 1, the fastener member being adapted to be snapped into secured pivotal contact with said post.

Figure 4:
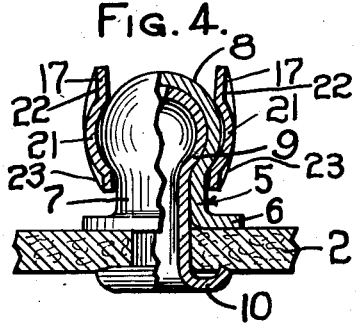
Fig. 4 is a transverse sectional view as taken on the line 4—4 of Fig. 3.

In the preferred embodiment, the post 5 is of hollow sheet metal construction having a support-engaging base or flange 6, a reduced neck 7 and an enlarged spherical head 8 formed integrally with the base 6 and disposed normal thereto. The post may be securely attached to the support 2 by means of a tubular rivet or eyelet having a shank 9 and flanged head 10, the shank 9 extending through the support 2, neck 7 and into the hollow head 8 from the opposite side of the support. The shank 9 of the eyelet or rivet is of sufficient length that its end will be upset within the spherical head 8 upon application of compressive forces applied to the head 8 and flange 10, as shown in Fig. 4, thus securely attaching the post 5 to the support 2.

Figure 3:
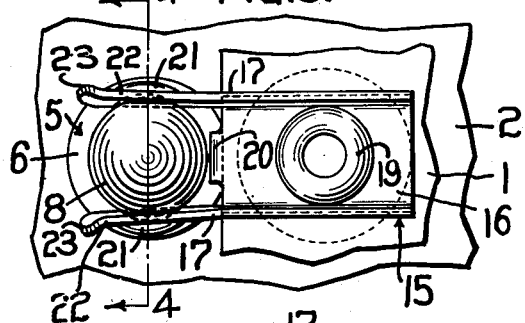
Fig. 3 is an enlarged top plan view of a pivotal mounting embodying the invention.
Figure 5:
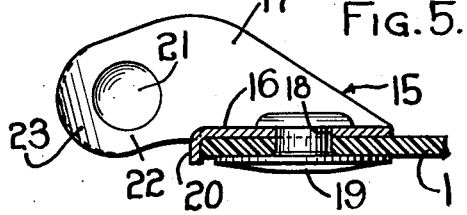
Fig. 5 is a longitudinal sectional view as taken on the line 5—5 of Fig. 6, showing the fastener member attached to a part to be supported.
Figure 6:
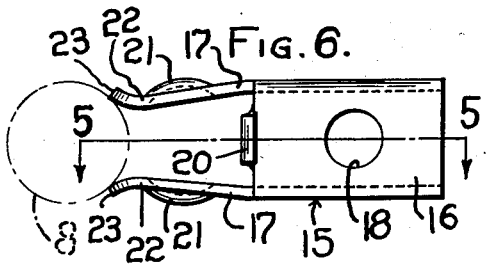
Fig. 6 is an enlarged bottom plan view of the fastener member of the mounting.

The fastener member 15 is adapted to be secured to the part to be supported, for example the eye shield 1, and preferably comprises a relatively flat part-engaging base 16 and a pair of opposed integral fastener arms 17 extending laterally beyond the base 16 and disposed in planes at right angles thereto, as shown in Figs. 3, 5 and 6. The base 16 may be provided with an aperture 18 for the reception of an eyelet or rivet 19 for securing the part 1 thereto, and may also be formed with an angularly turned stop 20 to be engaged by an edge of the part 1 and thus accurately position the part 1 relative to the fastener 15 and the pivotal axis of the mounting.

The end portions of the fastener arms 17 are provided with concaved seats 21 for the reception of convexed surfaces of the spherical head 8 and the marginal rim 22 of the arms 17 beyond the seats 21 are preferably concentric therewith so as not to interfere with the pivotal action of the fastener 15. Sections 23 of the rims 22 may be outwardly flared to provide an entering throat to facilitate snapping the fastener 15 upon the spherical head 8 of the post 5.

The fastener 15 preferably is formed of spring sheet metal so that the arms 17 are resilient yet possess a sufficient degree of stiffness to provide high tensional engagement with the head 8 and thus retain the fastener in the desired pivotal position. Preferably the arms 17 converge from the base 16 toward the opposed seats 21, as shown in Fig. 6, so that the seats will engage the head 8 under considerable tension when the fastener is snapped thereon. Additionally, the fastener 15 may be formed of 40–50 carbon steel and heat-treated for added stiffness. Normally the fastener arms grip the spherical head 8 under such high tension that the fastener cannot be readily removed from the post manually, except by means of some special tool for that purpose.

Figure 7:
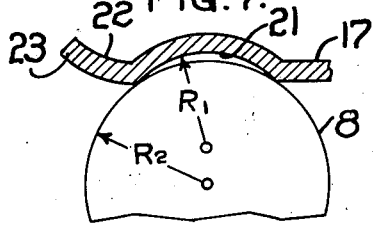
Fig. 7 is a greatly enlarged view illustrating the relation of the curvature of the fastener seats to the curvature of the spherical head of the supporting part.

Because of the high tensioned engagement between the head 8 and the seats 21 of the arms 17, it is desirable that the area of contact be reduced as much as is practicable. In the illustrated and preferred embodiment it is desired that the area of contact be restricted to an annular line or ring contact and preferably this may be accomplished by curving the concaved face of the seats 21 on a smaller radius $R_1$ than the radius $R_2$ of the convexed surface of the spherical head as shown in Fig. 7.

Although I have illustrated and described a preferred embodiment of the invention, I do not intend to be restricted to the details thereof as the scope of the invention is best defined in the appended claim.

I claim:

A ball and socket type mounting for movably connecting a part to a support comprising a post having a support-engaging flange adapted to be secured to a support and having a hollow spherical head adapted to receive an attaching member, a fastener member having a relatively flat base portion adapted to be secured to a part to be supported, a pair of spaced flanges secured to said base portion and extending beyond an edge thereof providing freely extending resilient end portions thereon, said end portions having opposed concave seats therein engaging opposed convexed surfaces of said spherical head, the radius of curvature of said seats being less than the radius of curvature of said head whereby said end portions resiliently engage said head through opposed annular lines of contact.

PHILIP D. BECKER.

REFERENCES CITED

The following references are of record in the file of this patent:

UNITED STATES PATENTS

| Number | Name | Date |
|---|---|---|
| 1,531,694 | Downing | Mar. 31, 1924 |
| 1,583,472 | King | May 4, 1926 |
| 2,242,021 | Ball | May 13, 1941 |
| 2,435,908 | Tinnerman | Feb. 10, 1948 |
| 2,500,280 | Feldman | Mar. 14, 1950 |
| 2,533,626 | Reiter | Dec. 12, 1950 |